HADCOCK & WILCOX.
Rake Tooth Point.
No. 22,235.
Patented Dec. 7, 1858.
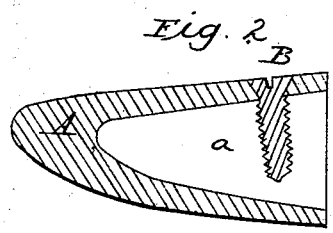
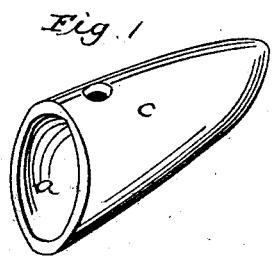
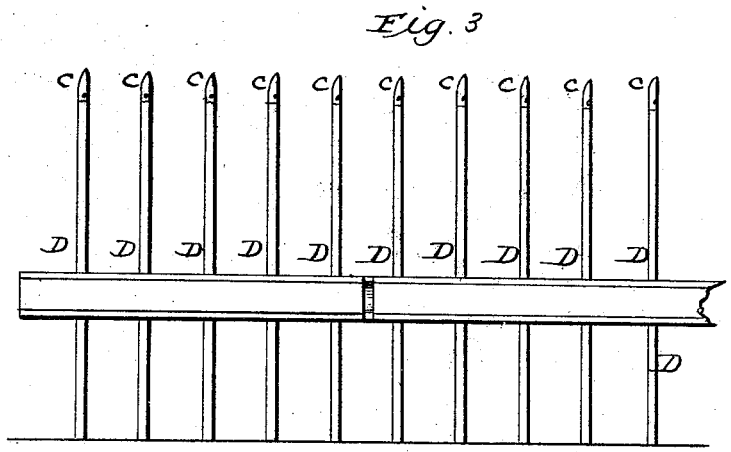
Inventors
John N Hadcock
Parker Wilcox

UNITED STATES PATENT OFFICE.

JOHN W. HADCOCK AND PARKER WILCOX, OF NORWAY, NEW YORK.

IMPROVEMENT IN HORSE-RAKES.

Specification forming part of Letters Patent No. 22,235, dated December 7, 1858.

*To all whom it may concern:*

Be it known that we, JOHN W. HADCOCK and PARKER WILCOX, of Norway, in the county of Herkimer and State of New York, have invented a new and improved mode of constructing the teeth of rakes, particularly applicable to horse-rakes of most of the kinds usually constructed; and we hereby declare the following to be a full and exact description of the same, reference being had to the drawings hereunto annexed, and forming part of this specification.

The nature of our invention consists in providing a shield or point of metal to rake-teeth which shall protect the said teeth from splintering or splitting, and also shall serve to keep them from entering the ground.

To enable others skilled in the manufacture to make and use our invention, we will proceed to describe its construction and application.

We make a thimble, C, Figure 1, usually of cast-iron, having something of a runner-shaped point, as seen in Fig. 2, and a cavity, $a$, to receive the properly-shaped point of the wooden tooth, and also a hole to receive the screw B, to secure it in position on the rake-teeth. Fig. 3 is a view of the rake-teeth, when the shield or points have been attached to the same.

What we claim as new, and desire to secure by Letters Patent, is—

The arrangement of the rake-teeth D with the metal point or shield C, as and for the purpose set forth and described.

JOHN W. HADCOCK.
PARKER WILCOX.

Witnesses:
LORENZO D. GAGE,
R. E. KANADY.